Feb. 17, 1970        H. TAX        3,495,846
STEERING MECHANISM FOR A CONTAINER-CARRYING VEHICLE
Filed Dec. 11, 1967        4 Sheets-Sheet 1
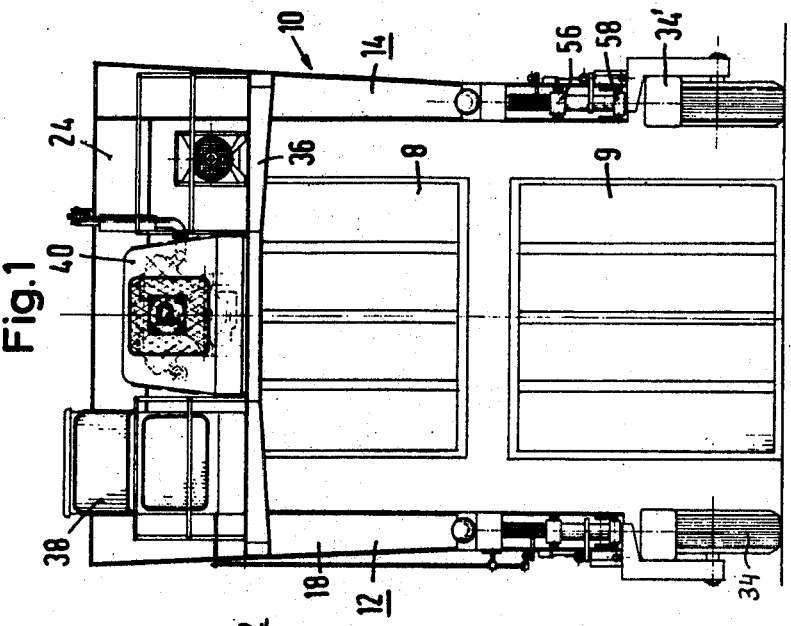
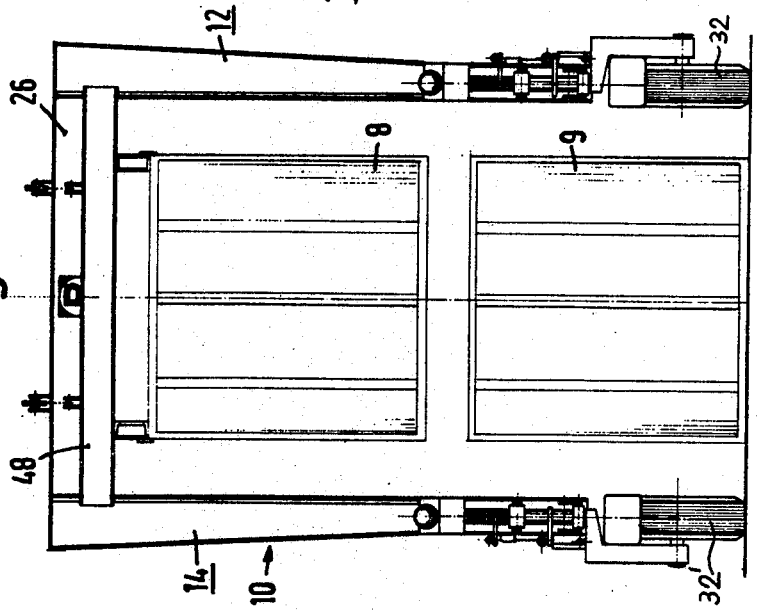
INVENTOR
HANS TAX
By: Low and Berman
Agents

United States Patent Office 3,495,846
Patented Feb. 17, 1970

3,495,846
STEERING MECHANISM FOR A CONTAINER-CARRYING VEHICLE
Hans Tax, 3 Potsdamer Strasse, 8 Munich 23, Germany
Filed Dec. 11, 1967, Ser. No. 689,606
Claims priority, application Germany, Dec. 15, 1966,
T 32,756
Int. Cl. B62d 7/06, 7/16
U.S. Cl. 280—91    5 Claims

ABSTRACT OF THE DISCLOSURE

A vehicle for transferring large containers within a storage area is equipped with four sets of wheels, each wheel being mounted on an individual steering knuckle, and one wheel of each set being driven. The steering mechanism of the vehicle not only permits the four sets of wheels to be turned for vehicle movement through curves, but also permits all wheels to be turned in unison, whereby the vehicle may move sideways or obliquely to its normal direction of movement in a straight path or in curves.

BACKGROUND OF THE INVENTION

This invention relates to load-carrying vehicles equipped with load-lifting mechanisms, and particularly to steering mechanisms for such vehicles.

The invention will be described hereinafter with reference to the handling of large containers of the type currently employed on container ships and having dimensions similar to those of a large truck trailer. Vehicles for handling such containers may be equipped with a frame defining a tunnel therein. In accepting a container, the frame is positioned so that it straddles the container which is thereafter raised by a lifting mechanism on the vehicle, and may then be transferred elsewhere, for example, for stacking on another similar container.

The vehicle must approach a container in the normal forward or backward direction of a its movement, and much valuable storage space heretofore had to be left unused in order to provide the wide aisles required by conventional container carrying vehicles for maneuvering into position relative to a container to be picked up.

The object of the invention is the provision of a steering system for a load-carrying vehicle of the type described which permits the vehicle not only to negotiate sharp curves, but also to move sideways in a straight or curved path.

SUMMARY OF THE INVENTION

With this object and others in view, as will become apparent hereinafter, the invention provides the steering mechanism of the vehicle with actuating means for turning all wheels on the vehicle frame in unison about substantially parallel pivot axes transverse of the respective axes of wheel rotation, and with means for keeping the axes of rotation of the wheels substantially parallel during the turning movement.

It is preferred to steer all wheels of the vehicle so that the steering mechanism must also include steering means for turning each wheel individually about its pivot axis in one direction, and for simultaneously turning another wheel in an opposite direction, this arrangement applying specifically to two wheels on the same side of the vehicle or its frame.

Other features, additional objects and many of the attendant advantages of this invention will readily be understood by reference to the following detailed description of preferred embodiments when considered in connection with the appended drawing.

BRIEF DESCRIPTION OF THE DRAWING

In the drawing:
FIG. 1 shows a vehicle of the invention in front elevation;
FIG. 3 is a rear elevational view of the vehicle.

DESCRIPTION OF THE PREFERRED EMBODIMENTS

Figure 2:
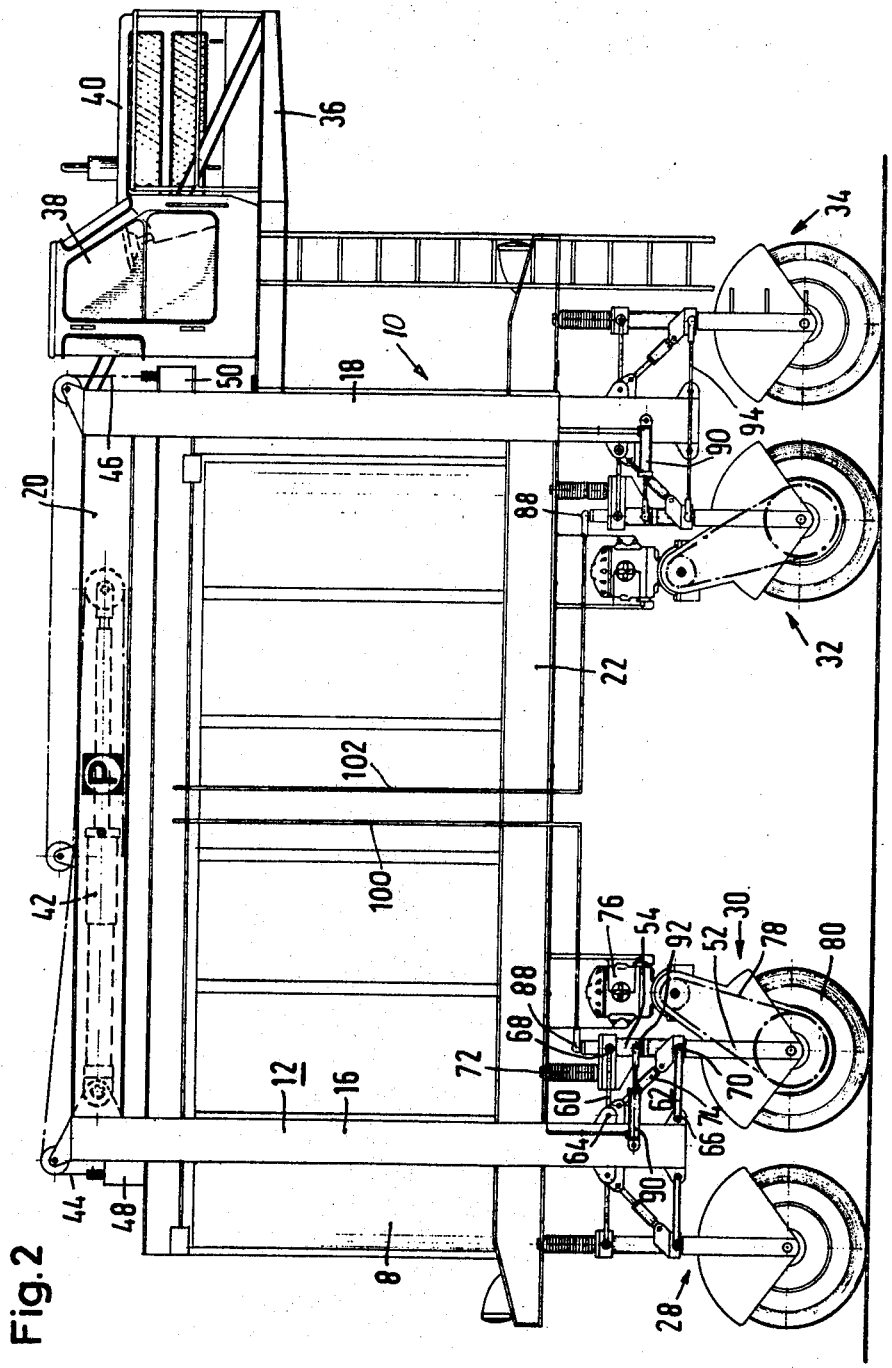
FIG. 2 illustrates the same vehicle in side elevation.

Referring initially to FIGS. 1 to 3, there is shown a vehicle for transporting large containers on a pier or in a congested storage area, the vehicle being described in more detail in the copending application of Hans Tax and Rüdiger Franke, Ser. No. 692,505, filed on Dec. 21, 1967.

The vehicle has a frame 10 consisting of two vertical side walls 12, 14 which are connected at their tops and from a downwardly open tunnel which extends longitudinally through the vehicle, and in which a container 8 may be suspended from the vehicle and raised to a height sufficient to permit the container 8 to be placed on top of a similar container 9 standing on the ground.

Each side wall 12, 14 consists essentially of two upright columns 16, 18 fixedly connected at the top and near the bottom by horizontal beams 20, 22. Transverse members 24, 26 respectively connect the front columns 18 and the rear columns 16 of the two frame walls 12, 14. Eight wheel assemblies 28, 30, 32, 34, 28', 30', 32', 34', are secured in pairs to the bottom ends of the four columns 16, 18 and to adjacent portions of the lower horizontal beams 22.

A cantilevered platform 36 forwardly projecting from the top of the frame 10 carries an operator's cab 38, a diesel engine 40, and hydraulic pumps (not illustrated) which transmit the power of the diesel engine 40 to the wheel assemblies and to other operating elements of the vehicle. The latter include jacks 42 of a load lifting mechanism, not itself relevant to this invention. The jacks 42, of which only one is seen in the drawing, are connected by steel cables or chains 44, 46 to vertically movable, transverse carrier beams 48, 50 near the front and rear ends of the frame 10 from which the container 8 is suspended in a manner not shown in detail.

Each of the eight wheel assemblies includes a crank-shaped knuckle 52 the lower end of which rotatably supports a wheel 80. The upper portion 54 of each knuckle 52 is journaled in two coaxial, vertically offset bearings 56, 58 (see FIG. 1). Links 60, 62 (FIG. 2) connect vertically offset pivots 64, 66 on the associated column 16 or 18 with corresponding pivots 68, 70 on the bearings 56, 58 to form a hinged parallelogram linkage which maintains the vertical position of the knuckle portion 54. Vertical displacement of the knuckle 52 and of the associated wheel 80 is normally impeded by a compression spring 72 interposed between the beam 22 and the pivot 68. The spring consists of a stack of Belleville washers. A conventional shock absorber 74 diagonally connects the pivot 64, 70 to damp vertical oscillation of the wheel assembly.

The wheel assemblies 30, 32, 30', 32' are individually driven by hydrostatic motors 76 which are supported by brackets on the associated knuckles 52, and connected to the driven wheels 800 by chain-and-sprocket drives 78. The engine 40 drives three hydraulic pumps (not shown) of which one is connected to the motors of the wheel assemblies 30, 30', the second is connected to the motors on the wheel assemblies 32, 32' whereas the third pump provides pressure fluid for the jacks 42 and for auxiliary hydraulic devices some of which will be described hereinbelow. Control valves, not shown, are interposed between the pumps and the motors 76 and other hydraulic devices, and are controlled from the operator's cab 38 in a conventional manner, not illustrated.

The direction of movement of the vehicle is controlled by steering linkages 100, 100', 102, 102' which connect a steering mechanism 124 operated from the cab 38 with the top ends 88 of the knuckles 52 in the driven wheel assemblies 30, 32, 30', 32', Conventional power steering controls, not themselves shown in the drawing, connect the linkages 100, 102, 100', 102' with hydraulic motors 90 associated with each knuckle 52 and interposed between a radial arm 92 on the knuckle portion 54 and the frame 10. The hydraulic motors 90 are energized when the steering stresses in the linkages 100, 100', 102, 102' exceed a certain limit.

A coupling bar 94 connects the knuckles of the driven and the idling wheel assemblies on each of the four columns 16, 18 in such a manner that the corresponding pairs of wheels 80 turn simultaneously about the respective, normally vertical knuckle axes and the planes of rotation of the wheels on the coupled knuckles remain approximately parallel, a suitable allowance being made for the different radii of curvature of the paths followed by the coupled wheels.

Figure 4:
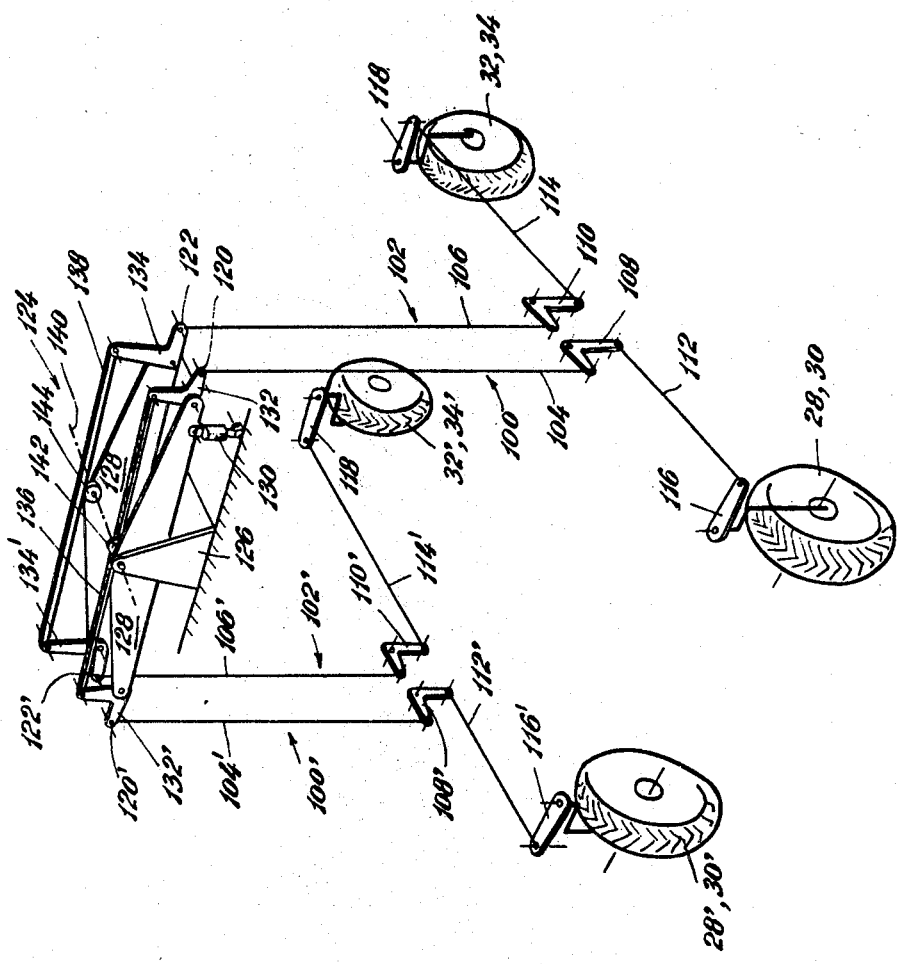
FIG. 4 shows the steering system of the vehicle illustrated in FIGS. 1 to 3 in a perspective, partly diagrammatic view.

The steering system of the vehicle described above with reference to FIGS. 1 to 3 is shown in more retail in FIG. 4. For the sake of simplicity, the coupled pairs of wheel assemblies 28–30, 32–34, 28'–30', and 32'–34' are each represented by a single wheel only. The pairs of wheel assemblies are respectively operated by steering linkages 100, 100', 102, 102'. The linkages include respective, rigid, upright rods 104, 104', 106, 106' whose lower ends are hingedly connected by bellcrank levers 108, 108', 110, 110' on the frame 108 to horizontal, rigid rods 112, 112', 114, 114' pivotally attached to radial arms 116, 116', 118, 118' on the knuckles of the driven wheel assemblies at 88, (see FIG. 2), the arrangement being such that the associated knuckles 52 turn clockwise in their bearings, as viewed from above, when the upright rods 104, 106, on the frame wall 12 move upward, and the rods 104', 106' on the frame will 14 move downward.

Pivots 120, 120', 122, 122' connect the upper ends of the rods 104, 104', 106, 106' to approximately horizontal arms of bellcrank levers 132, 132', 134, 134' carried in pairs on respective arms of a lever or rocker 128 in the control mechanism 124. The rocker 128 is pivotally supported on a horizontal steering shaft 140 journaled in two brackets 126 of which only one is seen in FIG. 4. The brackets are fixedly mounted on the frame 10. The arms of the bellcrank levers 132, 132' which are approximately vertical in the position of the apparatus shown in FIG. 4 are hingedly connected by a rack 136 whose upwardly extending teeth mesh with a pinion 142 keyed to the shaft 140. A rack 138 which similarly connects the bellcrank levers 134, 134' has downwardly directed teeth in meshing engagement with a pinion 144 keyed to the shaft 140. The shaft is connected to the steering wheel in the operator's cab 38 in a conventional manner, not shown.

A hydraulic cylinder 130 and its piston are interposed between one arm of the rocker 128 and the frame 10.

The apparatus illustrated in FIG. 4 operates as follows:

When the steering shaft 140 is turned, the racks 136, 138 move transversely of the frame 10 in opposite directions. Assuming that the rack 136 moves from the lever 132' toward the lever 132, the rods 104 and 106' move downward, and the rods 104' and 106' move upward. The front wheel assemblies 32, 32', 34, 34' are thereby swung clockwise as viewed from above, about the associated knuckle axes, and the rear wheel assemblies 28, 28', 30, 30' are swung counterclockwise from the illustrated position permitting the vehicle to make a tight right turn during forward movement. The angular displacement of the knuckles on the two pairs of wheel assemblies on the inside of the curve is somewhat greater than the corresponding displacement of the knuckles on the outside of the curve in accordance with the different radii of curve of the corresponding paths. The rocker 128 is held stationary during the afore-described steering operation by the hydraulic cylinder 130.

The two motion-transmitting bellcrank levers 132, 132' cooperate with the rack 136 to produce the same toe-out effect which is produced in a conventional automotive steering arrangement by the cooperation of the two steering arms on the front-wheel knuckles with a connecting tie rod in a trapeze pattern. The ratio of the angles of angular displacement between an inside wheel and an outside wheel on the front axle of a motor car about the respective knuckle axes is a function of the magnitude of one of these angles. The steering system of this invention operates in the same manner, the levers 134, 134' and the rack 138 also defining an analogous trapeze arrangement.

If it is desired to move the vehicle transversely of its normal direction of movement, the rocker 128 is swung on the shaft 140 by the cylinder 130 while the racks 136, 138 are prevented from moving on the rocker by the pinions 142, 144. Assuming the hydraulic motor 130 expands, and the rocker 128 moves counterclockwise on the shaft 140, the rods 102, 104 move upward, and the rods 102', 104' move downward. All wheel assemblies are thereby turned clockwise in unison, and the vehicle may be moved obliquely or perpendicularly to its normal direction of movement in a straight path, while all wheels rotate in parallel planes. The vehicle of course, may be steered to the right or left of that path by turning the shaft 140.

Figure 5:
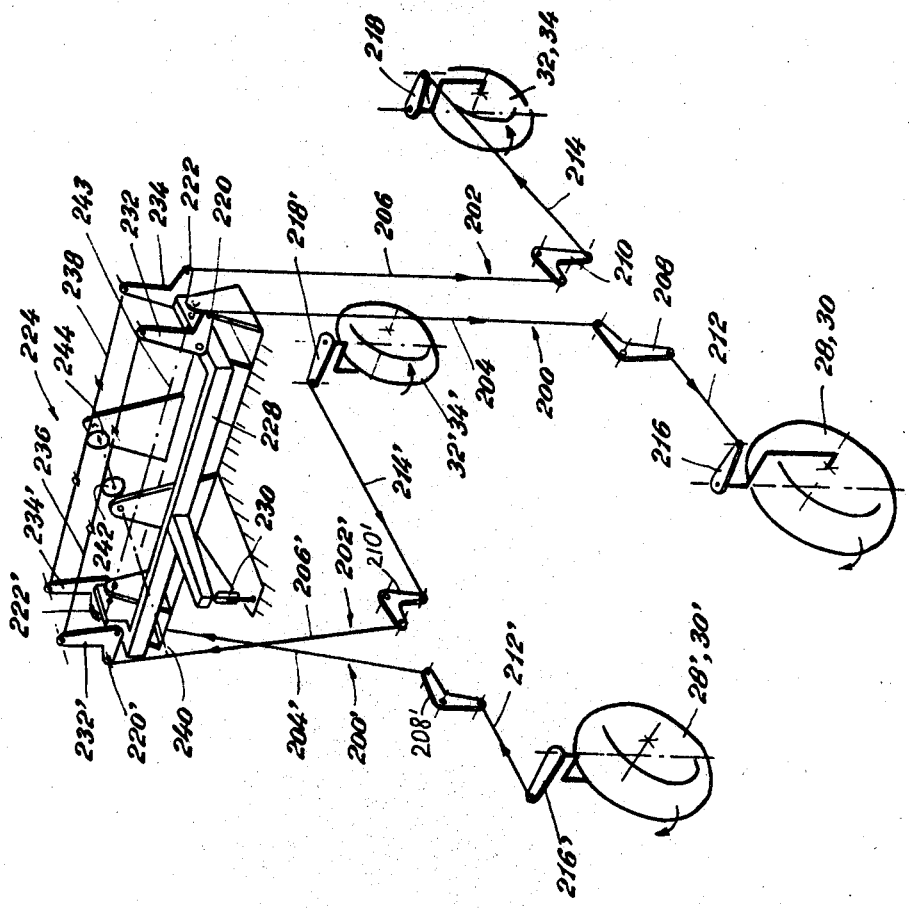
FIG. 5 shows a modification of the steering system of FIG. 4 in a corresponding view.

In the modified steering system shown in FIG. 5, elements corresponding to those illustrated in FIG. 4 have been provided with reference numerals augmented by 100. Arms 216, 216', 218, 218' on the knuckles of the driven wheel assemblies 30, 30', 32, 32' are thus connected by horizontal rods 212, 212', 214, 214' to bellcrank levers 208, 210, 208', 210'. A rocker 228 is mounted on a transverse shaft 243 on the top of the vehicle and can be swung about the axis of the shaft 243 by a hydraulic cylinder 230. Bellcrank levers 232, 234 on one end of the rocker 228 are respectively connected with bellcrank levers 232', 234' on the other end of the rocker by racks 236, 238, both meshing from above with pinions 242, 244 fixedly fastened on a steering shaft 240.

The bellcrank lever 232 is connected by a rod 204 to the right rear-wheel assemblies 28, 30, and the bellcrank lever 232' on the same rack 236 is connected by a rod 206' to the left front-wheel assemblies 32', 34'. Similarly, the bellcrank lever 234 is connected by a vertical rod 206 to the right front-wheel assemblies 32, 34, and the associated lever 234' is connected by a rod 204' to the left rear-wheel assemblies 28', 30'. The steering linkages 200, 200', 202, 202' differ from the linkages 100, 100', 102, 102' by the crossed rods 204', 206' and by a different arrangement of the bellcrank levers 208, 208'.

When the steering shaft 240 is turned clockwise, the bellcrank levers 232, 232', 234, 234' also swing clockwise in unison, but the four pairs of wheel assemblies are swung on their knuckles as indicated in the drawing by arrows to set the wheels for a left turn during normal forward movement of the vehicle.

When the rocker 228 is swung on the shaft 243 by the cylinder 230 during expansion of the latter, the bellcrank levers 232, 232', move upward and the levers 234, 234' move downward. All wheels turn clockwise about their knuckle axes for linear transverse movement of the vehicle.

Numerous variations and modifications of the steering systems described above with reference to FIGS. 4 and 5 can readily be arrived at by interchanging the illustrated elements, and by varying their positions and their connections, and it will be understood that such variations and modifications are within the scope of the instant invention.

While the invention has been described with specific reference to a vehicle for carrying large containers of the type employed in container ships, the invention is not limited to the specific application chosen for the purpose of the disclosure, and the steering systems of the invention are useful also in other vehicles which have to operate in crowded areas or otherwise require great maneuverability. The advantages of the steering system, however, are particularly important in vehicles equipped for transferring and stacking containers, packages, and the like in storage areas. The application of the invention to fork lifts is specifically contemplated.

It should be understood, therefore, that the foregoing disclosure relates only to preferred embodiments of the invention, and that numerous modifications and alternations may be made therein.

What is claimed is:
1. In a vehicle, in combination:
 (a) frame means having two opposite sides;
 (b) a plurality of rotatable wheels mounted on said frame means for movably supporting said frame means on a traffic surface, two of said wheels being mounted on the same side of said frame means; and
 (c) a steering system for pivoting said plurality of wheels about respective substantially parallel pivot axes transverse of the respective axes of rotation, the steering system including
  (1) a carrier movably mounted on said frame means,
  (2) a plurality of motion transmitting members movably mounted on said carrier,
  (3) first moving means for causing movement of said carrier on said frame,
  (4) second moving means for causing movement of said motion transmitting members on said carrier relative to each other,
  (5) linkage means respectively connecting said motion transmitting members to said two wheels for turning said two wheels about the pivot axes thereof in the same direction in response to one of said movements caused by said first and second moving means, and for turning said two wheels about said pivot axes thereof in opposite directions in response to the other one of said movements,
  (6) actuating means for turning the other wheels on said frame in unison about said pivot axes when said two wheels turn in said same direction, and
  (7) means for keeping the axes of rotation of all said wheels substantially parallel during said turning in unison.

2. In a vehicle as set forth in claim 1, said carrier being pivotally mounted on said frame means, and said first moving means causing pivotal movement of the carrier.

3. In a vehicle as set forth in claim 2, said carrier being a two-armed lever, a third and fourth wheel being mounted on the other side of said frame means, two of said motion transmitting members being mounted on each arm of said carrier, said linkage means connecting the motion transmitting members on the other arm to said arms to said two wheels respectively, and connecting the motion transmitting members on the other arm to said third and fourth wheels respectively for turning said third and fourth wheels about the respective pivot axes in said same direction when said two wheels are turned in said same direction, and for turning said third and fourth wheels in opposite directions about said pivot axes thereof, when said two wheels are turned in opposite directions.

4. In a vehicle as set forth in claim 3, the moving means causing the other one of said movements including toe-out means for varying the ratio between the angle of turning movement of said third wheel and the angle of turning movement of one of said two wheels in response to the angle of turning movement of said one wheel, said one wheel and said third wheel turning in the same direction about the respective axes of pivoting movement.

5. In a vehicle as set forth in claim 4, said linkage means responding to said pivotal movement of said carrier for moving said wheels in said same directions about said pivot axes thereof.

References Cited

UNITED STATES PATENTS

| 2,834,605 | 5/1958 | McCollough | 280—91 |
| 3,084,951 | 4/1963 | Burgess | 280—91 |
| 3,087,564 | 5/1963 | Quayle | 180—79.2 |
| 3,197,229 | 7/1965 | Houlton | 280—91 |
| 3,198,541 | 8/1965 | Christenson et al. | 280—91 |
| 3,396,861 | 8/1968 | Houlton | 180—79.2 X |
| 3,424,023 | 1/1969 | Mustered et al. | 280—91 X |

KENNETH H. BETTS, Primary Examiner

U.S. Cl. X.R.

180—79.2